(12) United States Patent
Huang et al.

(10) Patent No.: US 7,657,026 B2
(45) Date of Patent: Feb. 2, 2010

(54) SLIDING MECHANISM FOR SLIDE-TYPE PORTABLE ELECTRONIC DEVICE

(75) Inventors: Nan-Tsung Huang, Shindian (TW); Chen-Hui Wu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 279 days.

(21) Appl. No.: 11/653,825

(22) Filed: Jan. 12, 2007

(65) Prior Publication Data
US 2008/0075274 A1 Mar. 27, 2008

(30) Foreign Application Priority Data
Sep. 8, 2006 (CN) .......................... 2006 1 0062528

(51) Int. Cl.
*H04M 9/00* (2006.01)
*H04M 1/00* (2006.01)
(52) U.S. Cl. ............................... 379/433.12; 455/575.4
(58) Field of Classification Search ............ 379/433.12, 379/433.11; 455/575.4, 575.1, 90.2, 90.3
See application file for complete search history.

(56) References Cited

U.S. PATENT DOCUMENTS

2005/0009581 A1 * 1/2005 Im et al. .................. 455/575.4
2005/0113154 A1 * 5/2005 Park et al. ................ 455/575.4

* cited by examiner

*Primary Examiner*—Curtis Kuntz
*Assistant Examiner*—Phylesha Dabney
(74) *Attorney, Agent, or Firm*—Steven M. Reiss

(57) ABSTRACT

A sliding mechanism (6) includes a main board (10) and a sliding board (20). The main board has a body (11). A guiding rail (112) is formed at each of two opposite sides of the body. The sliding board has a first portion (21) and a second portion (22). The first portion has a first guiding slot (216) defined in a first end thereof for receiving one guiding rail. A bottom slice extends from a second opposite end of the first portion. The second portion has a second guiding slot (226) defined in a first end thereof for receiving the other guiding rail. A top slice extends from a second opposite end of the second portion. The top slice is located on the bottom slice. Before connecting the first portion and the second portion, a clearance between the guiding rail and the first portion can be adjusted.

20 Claims, 3 Drawing Sheets

SLIDING MECHANISM FOR SLIDE-TYPE PORTABLE ELECTRONIC DEVICE

CROSS-REFERENCE TO RELATED APPLICATION

This application is related to a co-pending U.S. patent application Ser. No. 11/653,826, entitled "SLIDING MECHANISM FOR SLIDE-TYPE PORTABLE ELECTRONIC DEVICE", by Huang et al. Said application has the same assignee as the present application and is concurrently filed herewith. The disclosure of the above-identified application is incorporated herein by reference.

BACKGROUND OF THE INVENTION

1. Field of the Invention

The present invention generally relates to sliding mechanisms for slidably connecting two members and, more particularly, to a sliding mechanism configured (i.e., structured and arranged) for use in a slide-type portable electronic device to slidably interconnect two casings of a device.

2. Description of Related Art

Slide-type portable electronic devices have become increasingly popular, a typical slide-type portable electronic device is configured to have two housings. One of the housings slides over the other housing, thus enabling opening/closing of the portable electronic device by means of a sliding mechanism.

A typical sliding mechanism includes two guiding rails symmetrically formed on two sides of one housing. The other housing has two guiding arms formed at two sides thereof. Each guiding arm defines a guiding slot therein. The guiding rails are configured for receipt in the two guiding slots. The size of each guiding rail is slightly smaller than the size of the guiding slot. That is to say there is a small clearance between the guiding rail and the guiding arm. The guiding rails are slidable in the guiding slots thereby allowing one housing to slide relative to the other housing. However, the guiding rails and the guiding arms are likely to undergo wear and tear because of continual friction between them, and correspondingly the clearance may become wider and wider. Thus, the two housings may not fit properly to each other. That is to say one housing may shake relative to the other housing.

Therefore, a new sliding mechanism for slide-type portable devices is desired in order to overcome the above-described shortcomings.

SUMMARY

In one embodiment thereof, a sliding mechanism for a portable electronic device includes a main board and a sliding board. The main board has a body. A guiding rail is formed at each of two opposite sides of the body. The sliding board is slidably mounted to the main board. The sliding board has a first portion and a second portion. The first portion has a first guiding slot defined in a first end thereof. One guiding rail is configured for reception in the first guiding slot. A bottom slice extends from a second opposite end of the first portion. The second portion has a second guiding slot defined in a first end thereof. The other guiding rail is configured for reception in the second guiding slot. A top slice extends from a second opposite end of the second portion. The top slice of the second portion is located on the bottom slice of the first portion and is connected to the first portion. Before connecting the first portion and the second portion, a clearance between the guiding rail and the first portion can be adjusted.

Other advantages and novel features of the embodiments will become more apparent from the following detailed description thereof when taken in conjunction with the accompanying drawings.

BRIEF DESCRIPTION OF THE DRAWINGS

Many aspects of the present sliding mechanism can be better understood with reference to the following drawings. The components in the drawings are not necessarily drawn to scale, the emphasis instead being placed upon clearly illustrating the principles of the sliding mechanism and its potential applications. Moreover, in the drawings, like reference numerals designate corresponding parts throughout the several views.

DETAILED DESCRIPTION OF THE EMBODIMENTS

Figure 1:
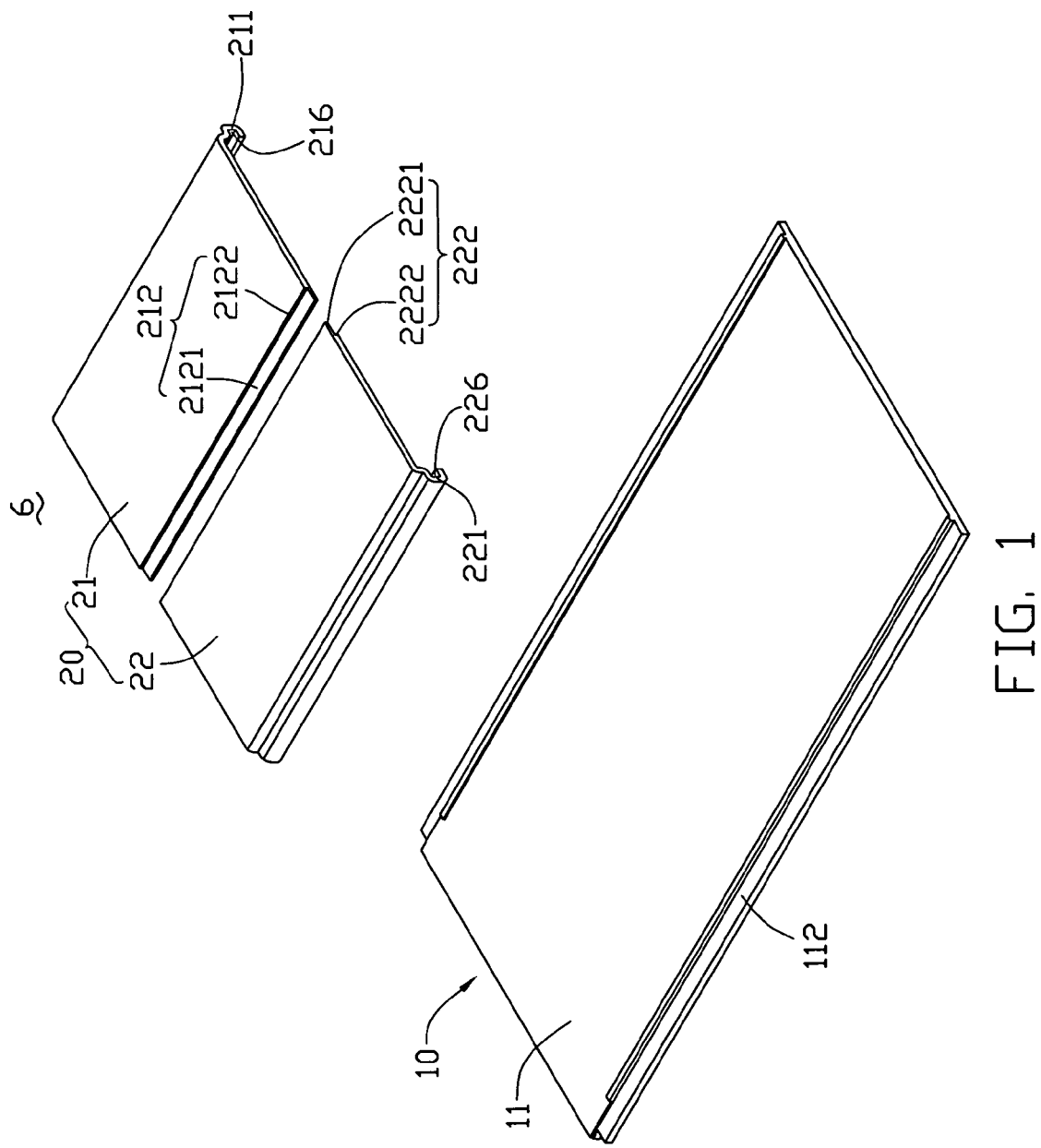
FIG. 1 is an exploded, isometric view of a sliding mechanism in accordance with a preferred embodiment.
Figure 2:
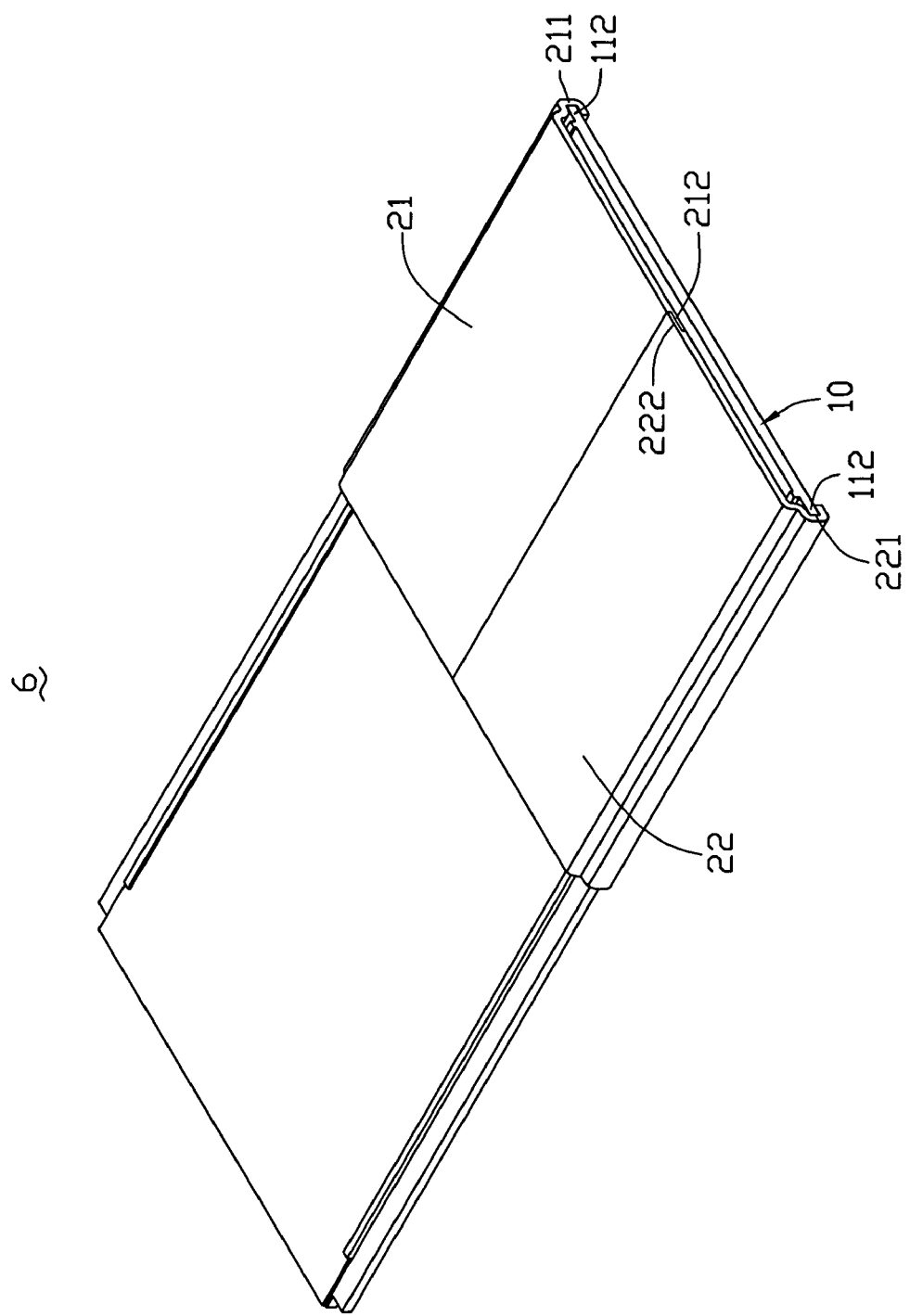
FIG. 2 is an assembled, isometric view of the sliding mechanism in FIG. 1.
Figure 3:
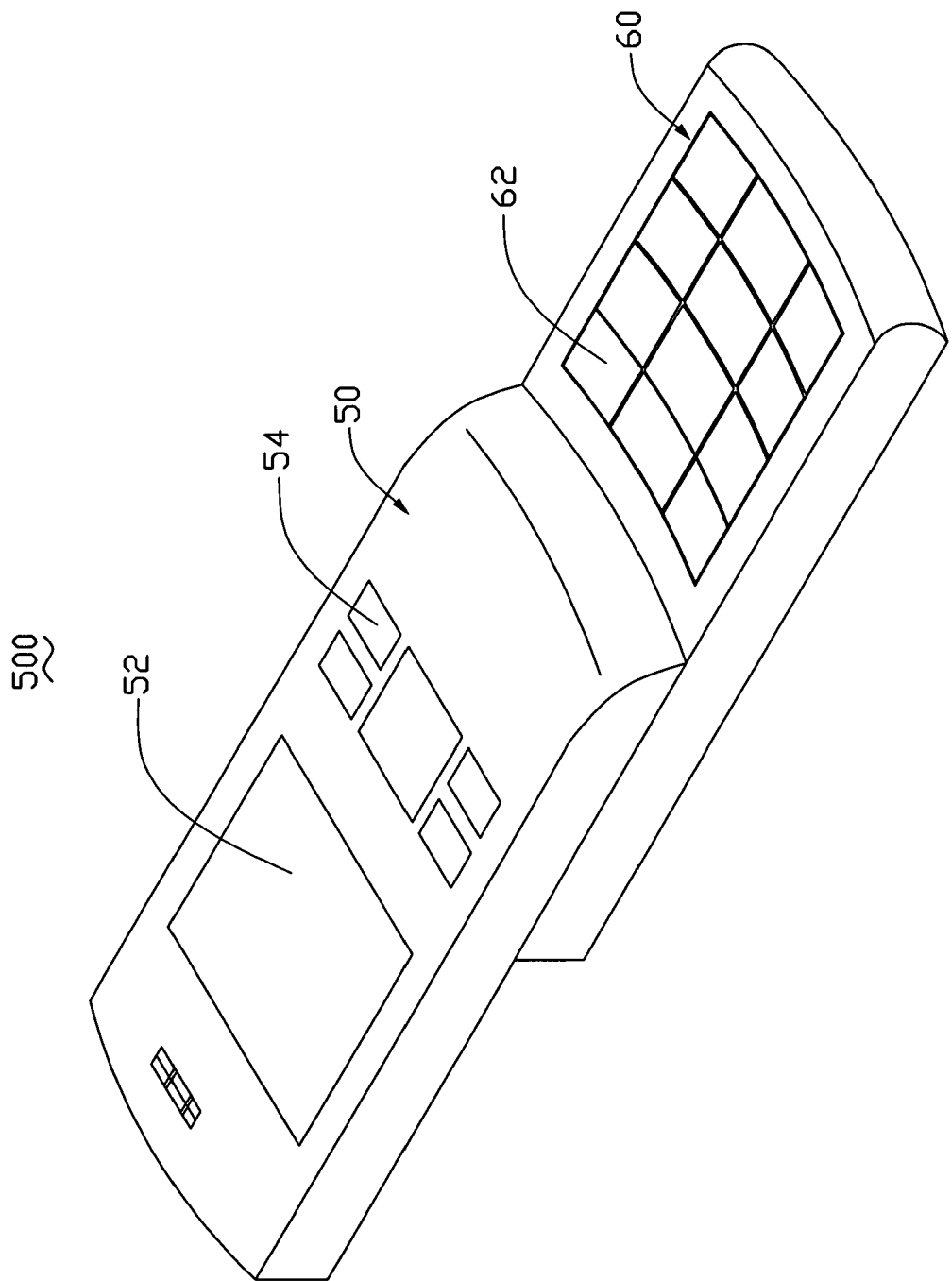
FIG. 3 is an isometric view of a portable electronic device equipped with the sliding mechanism.

FIGS. 1-3 show a sliding mechanism 6 according to a preferred embodiment. The sliding mechanism 6, in the illustrated embodiment, is used to interconnect a first case 50 and a second case 60 of a mobile phone 500. A keypad 62 is formed on a surface of the second case 60. A display 52 and a secondary keypad 54 are formed on a surface of the first case 50. The first case 50 is slidable relative to the second case 60 by means of the sliding mechanism 6. In an open position, the first case 50 slides away from the second case 60 allowing operation of the keypad 62. In a closed position, the first case 50 covers the keypad 62, thus protecting the keypad 62. While the sliding mechanism 6 is shown in use with the mobile phone 500, it should be understood that the sliding mechanism 6 or obvious variations thereof may prove useful in other work environments (e.g., personal digital assistants) as well.

Also further referring to FIG. 1, the sliding mechanism 6 includes a main board 10 and a sliding board 20. The sliding board 20 is slidable relative to the main board 10.

The main board 10 has a body 11. The body 11 is substantially a flat board in shape. A guiding rail 112 is directly formed at each of two opposite sides of the body 11. Each guiding rail 112 is substantially strip-shaped.

The sliding board 20 includes a first portion 21 and a second portion 22. The first portion 21 is substantially a flat board in shape. A first guiding arm 211 is directly formed at a first side of the first portion 21. The first guiding arm 211 is substantially U-shaped and defines a first guiding slot 216 therein. A second side of the first portion 21 opposite to the first side has a first connecting portion 212. The first guiding slot 216 faces towards the first connecting portion 212. The first connecting portion 212 includes a bottom slice 2121 extending from a bottom end of the first connecting portion 212 and thereby forming a top step 2122.

The second portion 22 is substantially a flat board in shape. A second guiding arm 221 is directly formed at a first side of the second portion 22. The second guiding arm 221 is substantially U-shaped and defines a second guiding slot 226 therein. A second side of the second portion 22 opposite to the first side has a second connecting portion 222. The second guiding slot 226 faces towards the second connecting portion 222. The second connecting portion 222 includes a top slice 2221 extending from a top end of the second connecting portion 222 thereby forming a bottom step 2222. A thickness of the bottom slice 2121 of the first connecting portion 212 is substantially equal to a thickness of the bottom step 2222 of the second connecting portion 222. A thickness of the top step 2122 of the first connecting portion 212 is substantially equal to a thickness of the top slice 2221 of the second connecting portion 222.

In assembly, one guiding rail 112 of the main board 10 is inserted into the first guiding slot 216 of the first portion 21 of the sliding board 20. The other guiding rail 112 of the main board 10 is inserted into the second guiding slot 226 of the second portion 22 of the sliding board 20. The top slice 2221 of the second connecting portion 222 of the second portion 22 is located on the bottom slice 2121 of the first connecting portion 212 of the first portion 21. A first horizontal clearance between the first guiding arm 211 of the first portion 21 and the guiding rail 112 can be adjusted according to the practical requirement. A second horizontal clearance between the second guiding arm 221 of the second portion 22 and the guiding rail 112 can also be adjusted according to the practical requirement. When the adjustments of the two horizontal clearances are finished, the first connecting portion 212 and the second connecting portion 222 are connected together by means of laser weld. Thus, the sliding mechanism 6 is completely assembled, as represented in FIG. 2.

Also further referring to FIG. 3, In use, the main board 10 is mounted to the first case 50 of the mobile phone 500. The sliding board 20 is mounted to the main board 10 by the above-described assembling process. The sliding board 20 is mounted to the second case 60 of the mobile phone 500. Thus, the first case 50 is slidable relative to the second case 60, thereby allowing the opening/closing of the mobile phone 500 by means of the sliding mechanism 6.

It is to be understood that the first connecting portion 212 of the first portion 21 and the second connecting portion 222 of the second portion 22 can be connected together by other means such as shot welding, oxygen welding, lap welding, or other metallurgical methods or forms of cementation.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism in a portable electronic device comprising:
   a main board having a body, a guiding rail being formed at each of two opposite sides of the body; and
   a sliding board slidably mounted to the main board, the sliding board including:
   a first portion having a first guiding slot defined in a first end thereof, one guiding rail slidably received in the first guiding slot, a bottom slice extending from a second opposite end of the first portion; and
   a second portion connected to the first portion, the second portion having a second guiding slot defined in a first end thereof the other guiding rail slidably received in the second guiding slot, a top slice extending from a second opposite end of the second portion, the top slice either partially or wholly covering the bottom slice according to adjustments of the clearances between the guiding rails and the first portion and the second portion before connecting the originally separated first and second portions.

2. The sliding mechanism as claimed in claim 1, wherein the first portion has a first guiding arm, the first guiding arm is configured to define the first guiding slot, and a horizontal clearance between the first guiding arm and the guiding rail can be adjusted.

3. The sliding mechanism as claimed in claim 2, wherein the first guiding arm is substantially U-shaped.

4. The sliding mechanism as claimed in claim 1, wherein the second portion has a second guiding arm, the second guiding arm is configured to define the second guiding slot, and a horizontal clearance between the second guiding arm and the guiding rail can be adjusted.

5. The sliding mechanism as claimed in claim 4, wherein the second guiding arm is substantially U-shaped.

6. The sliding mechanism as claimed in claim 1, wherein the guiding rail is substantially strip-shaped.

7. The sliding mechanism as claimed in claim 1, wherein the first portion and the second portion are connected together by one way selected from a group consisting of laser welding, shot welding, oxygen welding, lap welding, and other metallurgical means and forms of cementation.

8. The sliding mechanism as claimed in claim 1, wherein a top step is formed on a top end of the first portion and a thickness of the top step of the first portion is substantially equal to a thickness of the top slice of the second portion.

9. The sliding mechanism as claimed in claim 1, wherein a bottom step is formed on a bottom end of the second portion and a thickness of the bottom slice of the first portion is substantially equal to a thickness of the bottom step of the second portion.

10. A portable electronic device comprising:
    a first case;
    a second case; and
    a sliding mechanism slidably interconnecting the first case and the second case, the sliding mechanism comprising:
    a main board having a body, a guiding rail being formed at each of two opposite sides of the body; and
    a sliding board slidably mounted to the main board, the sliding board including:
    a first portion having a first guiding slot defined in a first end thereof, one guiding rail slidably received in the first guiding slot, a bottom slice extending from a second opposite end of the first portion; and
    a second portion connected to the first portion, the second portion having a second guiding slot defined in a first end thereof, the other guiding rail slidably received in the second guiding slot, a top slice extending from a second opposite end of the second portion, the top slice either partially or wholly covering the bottom slice according to adjustments of the clearances between the guiding rails and the first portion and the second portion before connecting the originally separated first and second portions.

11. The portable electronic device as claimed in claim 10, wherein the first portion has a first guiding arm, the first guiding arm is configured to define the first guiding slot, and a horizontal clearance between the first guiding arm and the guiding rail can be adjusted.

12. The portable electronic device as claimed in claim 11, wherein the first guiding arm is substantially U-shaped.

13. The portable electronic device as claimed in claim 10, wherein the second portion has a second guiding arm, the second guiding arm is configured to define the second guiding slot, and a horizontal clearance between the second guiding arm and the guiding rail can be adjusted.

14. The portable electronic device as claimed in claim 13, wherein the second guiding arm is substantially U-shaped.

15. The portable electronic device as claimed in claim 10, wherein the first portion and the second portion are connected together by one way selected from a group consisting of laser welding, shot welding, oxygen welding, lap welding, and other metallurgical means and forms of cementation.

16. The portable electronic device as claimed in claim 10, wherein a top step is formed on a top end of the first portion and a thickness of the top step of the first portion is substantially equal to a thickness of the top slice of the second portion.

17. The portable electronic device as claimed in claim 10, wherein a bottom step is formed on a bottom end of the second portion and a thickness of the bottom slice of the first portion is substantially equal to a thickness of the bottom step of the second portion.

18. A method for fabricating a sliding mechanism in a portable electronic device comprising steps:

providing a main board comprising a body, and two guiding rails formed on two opposite sides of the body respectively;

providing a first portion having a first guiding slot defined in a first end thereof and a bottom slice extending from a second opposite end of thereof;

providing a second portion having a second guiding slot defined in a first end thereof and a top slice extending from a second opposite end thereof;

mounting the first portion and the second portion to the main board, the first guiding slot and the second guiding slot slidably receiving the two guiding rails respectively;

adjusting the clearances between the guiding rails and the first portion and the second portion; and connecting the two separated second portion and the first portion, the top slice either partially or wholly covering the bottom slice according to the adjustments of the clearances.

19. The method for fabricating a sliding mechanism as claimed in claim 18, wherein:

the first portion has a first guiding arm defining the first guiding slot and an adjustable horizontal clearance between the first guiding arm and the guiding rail; and the second portion has a second guiding arm defining the second guiding slot and an adjustable horizontal clearance between the second guiding arm and the guiding rail.

20. The method for fabricating a sliding mechanism as claimed in claim 19, wherein the first portion and the second portion are connected together by one way selected from a group consisting of laser welding, shot welding, oxygen welding, lap welding, and other metallurgical means and forms of cementation.

* * * * *

UNITED STATES PATENT AND TRADEMARK OFFICE
CERTIFICATE OF CORRECTION

PATENT NO.        : 7,657,026 B2                                       Page 1 of 1
APPLICATION NO. : 11/653825
DATED             : February 2, 2010
INVENTOR(S)       : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 300 days.

Signed and Sealed this

Thirtieth Day of November, 2010

David J. Kappos
*Director of the United States Patent and Trademark Office*